(12) United States Patent
Arnold et al.

(10) Patent No.: US 12,306,794 B2
(45) Date of Patent: May 20, 2025

(54) ANALYTICS WORKFLOW INTEGRATED WITH LOGIC CONTROL

(71) Applicant: Alteryx, Inc., Irvine, CA (US)

(72) Inventors: Jeff Arnold, Arvada, CO (US); Adam David Riley, Orwell (GB)

(73) Assignee: Alteryx, Inc., Irvine, CA (US)

( * ) Notice: Subject to any disclaimer, the term of this patent is extended or adjusted under 35 U.S.C. 154(b) by 88 days.

(21) Appl. No.: 17/485,234

(22) Filed: Sep. 24, 2021

(65) Prior Publication Data

US 2023/0113187 A1     Apr. 13, 2023

(51) Int. Cl.
    *G06F 16/16*     (2019.01)
    *G06F 16/18*     (2019.01)

(52) U.S. Cl.
    CPC ........ *G06F 16/164* (2019.01); *G06F 16/1805* (2019.01)

(58) Field of Classification Search
    CPC .......................... G06F 16/164; G06F 16/1805
    USPC ......................................................... 707/822
    See application file for complete search history.

(56) References Cited

U.S. PATENT DOCUMENTS

| | | | |
|---|---|---|---|
| 2017/0102693 A1* | 4/2017 | Kidd | G05B 19/41875 |
| 2020/0007322 A1* | 1/2020 | Weldemariam | G06F 16/27 |
| 2021/0385251 A1* | 12/2021 | Crabtree | G06F 16/951 |

OTHER PUBLICATIONS

PCT International Search Report and Written Opinion, PCT Application No. PCT/US 22/43540, Jan. 17, 2023, 18 pages.

\* cited by examiner

*Primary Examiner* — Tuankhanh D Phan
(74) *Attorney, Agent, or Firm* — FIG. 1 Patents

(57) ABSTRACT

A workflow includes a sequence of tools and a logic controller. A data file is input into the workflow and processed by the tools. A log file and a metadata file are generated for a tool. The log file includes data describing events that occurred during the operation of the tool in the processing of the data file. The metadata file includes data generated from the performance of the data analytics function of the tool. The logic controller uses the log file to determine whether to trigger a subsequent tool. Responsive to a determination of trigging the subsequent tool, the metadata file is sent to the subsequent tool and processed by a subset of the sequence of tools to generate a result item. The subset starts with the subsequent tool. The result item represents an outcome of the processing of the data file by the workflow.

20 Claims, 7 Drawing Sheets

ANALYTICS WORKFLOW INTEGRATED WITH LOGIC CONTROL

BACKGROUND

Field of Art

The described embodiments pertain in general to data analytics, and in particular to an analytics workflow integrated with logic control.

Description of the Related Art

The growth of data analytic platforms, such as Big Data Analytics, has expanded data processing into a tool for processing large volumes of data to extract information having business value. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computer devices.

Currently, analytics workflows are widely used to perform data processing. However, the currently available workflow tools are limited as they usually do not allow the user to intervene with data analytics processes even when such intervention would be helpful.

Thus, improved technology for analytics workflows is needed.

SUMMARY

The above and other issues are addressed by a computer-implemented method, computer system, and computer-readable storage medium for managing memory in a computer. An embodiment of the computer-implemented method includes accessing an analytics workflow comprising a sequence of tools. Each tool in the sequence is adapted to perform a data analytics function. The method further includes inputting a data file into the analytics workflow to process the data file by using the sequence of tools. The method further includes generating a log file for a first tool in the sequence. The log file includes data describing events that occurred during performance of the data analytics function of the first tool in the processing of the data file. The method further includes generating a metadata file. The metadata file includes data generated by the first tool from the performance of the data analytics function of the first tool in the processing of the data file. The method further includes determining whether to trigger the data analytics function of a second tool in the sequence based on the log file for the first tool. The second tool is subsequent to the first tool in the sequence. The method further includes in response to determining to trigger the data analytics function of the second tool, sending the metadata file to the second tool. The second tool is adapted to process the metadata file according to the analytics workflow.

An embodiment of the computer system includes a computer processor for executing computer program instructions. The system also includes a non-transitory computer-readable storage medium storing computer program instructions that when executed cause the computer processor to perform operations. The operations include accessing an analytics workflow comprising a sequence of tools. Each tool in the sequence is adapted to perform a data analytics function. The operations further include inputting a data file into the analytics workflow to process the data file by using the sequence of tools. The operations further include generating a log file for a first tool in the sequence. The log file includes data describing events that occurred during performance of the data analytics function of the first tool in the processing of the data file. The operations further include generating a metadata file. The metadata file includes data generated by the first tool from the performance of the data analytics function of the first tool in the processing of the data file. The operations further include determining whether to trigger the data analytics function of a second tool in the sequence based on the log file for the first tool. The second tool is subsequent to the first tool in the sequence. The operations further include in response to determining to trigger the data analytics function of the second tool, sending the metadata file to the second tool. The second tool is adapted to process the metadata file according to the analytics workflow.

An embodiment of the non-transitory computer-readable memory stores executable computer program instructions. The instructions are executable to perform operations. The operations include accessing an analytics workflow comprising a sequence of tools. Each tool in the sequence is adapted to perform a data analytics function. The operations further include inputting a data file into the analytics workflow to process the data file by using the sequence of tools. The operations further include generating a log file for a first tool in the sequence. The log file includes data describing events that occurred during performance of the data analytics function of the first tool in the processing of the data file. The operations further include generating a metadata file. The metadata file includes data generated by the first tool from the performance of the data analytics function of the first tool in the processing of the data file. The operations further include determining whether to trigger the data analytics function of a second tool in the sequence based on the log file for the first tool. The second tool is subsequent to the first tool in the sequence. The operations further include in response to determining to trigger the data analytics function of the second tool, sending the metadata file to the second tool. The second tool is adapted to process the metadata file according to the analytics workflow.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
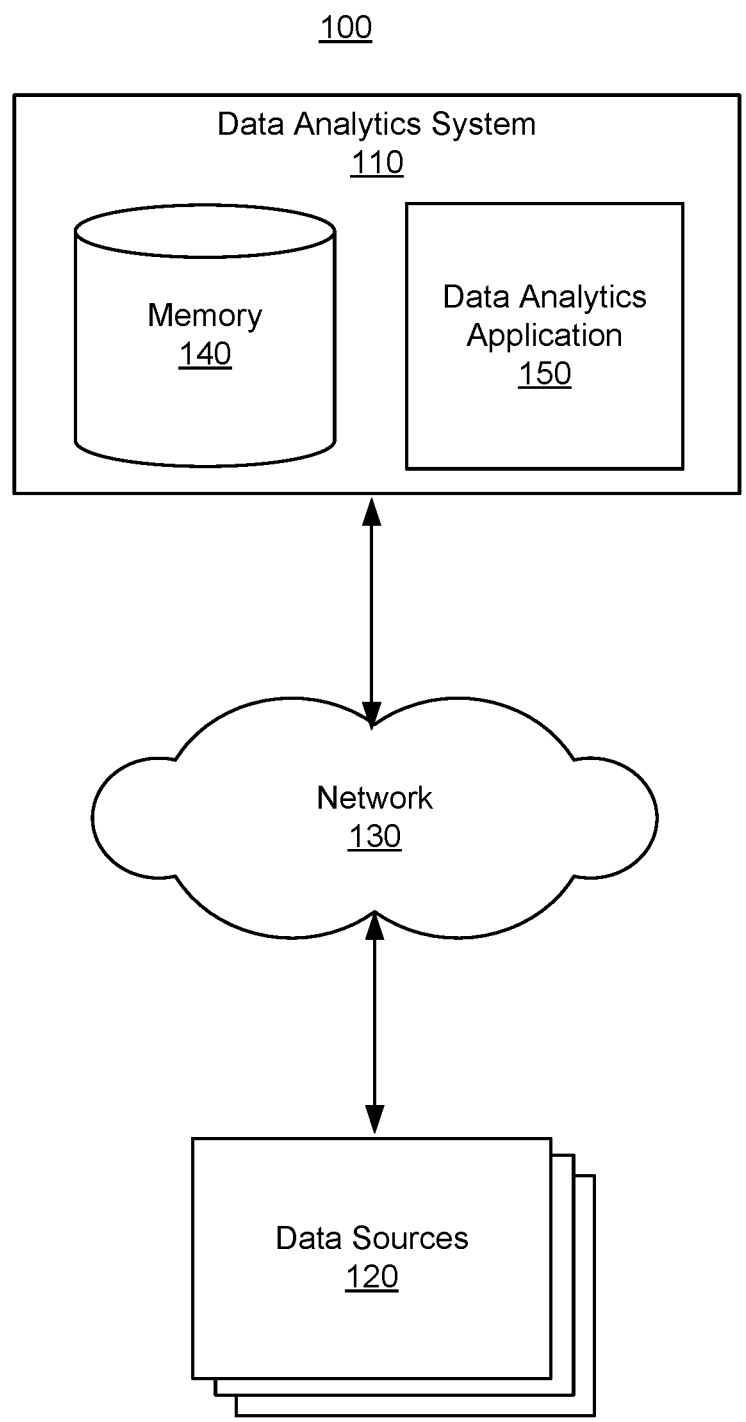
FIG. 1 is a block diagram illustrating a data analytics environment including a data analytics system according to one embodiment.

FIG. 1 is a block diagram illustrating a data analytics environment 100 including a data analytics system 110 according to one embodiment. The environment 100 further includes multiple data sources 120 connected to the data analytics system 110 via a network 130. Although the illustrated environment 100 contains only one data analytics system 110 coupled to multiple data sources 120, embodiments can have multiple data analytics systems and a singular data source.

The data analytics system 110 is a computer-based system utilized for processing large amounts of data. The data are collected, gathered, or otherwise accessed from the multiple data sources 120 via the network 130. The data analytics system 110 can implement scalable software tools and hardware resources employed in data processing tasks from a wide variety of data sources. A data processing task (also referred to as a task or data analytics task) is a computing operation for processing data. A data processing task includes, e.g., accessing data, preparing data, blending data, packaging data, analyzing data, other types of operations on data, or some combination thereof. The data analytics system 110 can perform multiple tasks in parallel. When it has computer resources (e.g., memory) available, the data analytics system 110 can pick a task to perform from a plurality of tasks that are ready to be performed.

In the embodiment of FIG. 1, the data analytics system 110 includes a memory 140 and a data analytics application 150. The memory 140 stores data used in data analytic operations and provides access to data storage area(s). In some embodiments, the memory 140 includes random access memory (RAM), hard disk drive (HDD), solid-state drive (SSD), other forms of computer memory, or some combination thereof. In some embodiments, the memory 140 includes a primary memory 140 providing relatively fast access to a relatively small data storage area and a secondary memory 150 providing relatively slow access to a relatively large data storage area.

Figure 2:
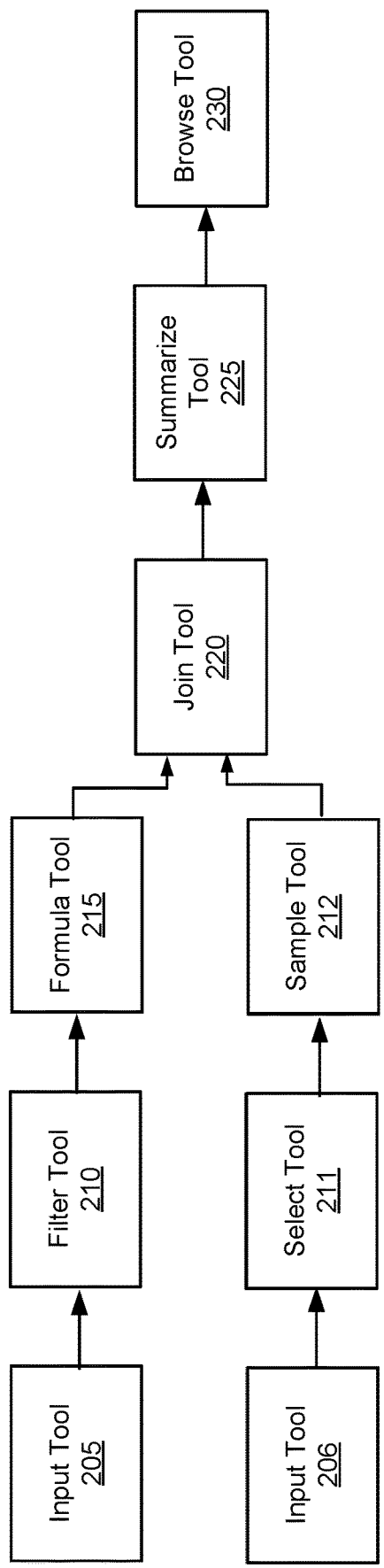
FIG. 2 is a block diagram illustrating a workflow created using the data analytics system to process data according to one embodiment.

The data analytics application 150 is a software application supporting execution of data analytics tasks by using analytics workflows (also referred to as "workflows"), such as the workflow illustrated in FIG. 2. A workflow is a sequence of data analytics tools (also referred to as "tools"), through which a data analytics task passes from initiation (e.g., input of a data file) to completion (e.g., output of an outcome of the task). Each tool in the sequence performs a specific processing operation or data analytics function, such as input, output, preparation, join, predictive, spatial, investigation, parse, transform, and so on. Execution of the workflow includes operations of the tools in the workflow and generates a result item representing the outcome of the task. The result item, in one example, is a chart that provides a visual representation of the outcome of the task.

The data analytics application 150 provides an environment that facilitates creation of workflows. For instance, the data analytics application 150 provides a visual workflow environment supported by a GUI of the data analytics application 150. The visual workflow environment enables a set of drag and drop tools that eliminate the need for providing software code to design a workflow and eliminate the need to identify complex formulas to be implemented by a workflow. In another embodiment, the workflow 200 is created and described in a document, such as an extensible markup language (XML) document.

Figure 4A:
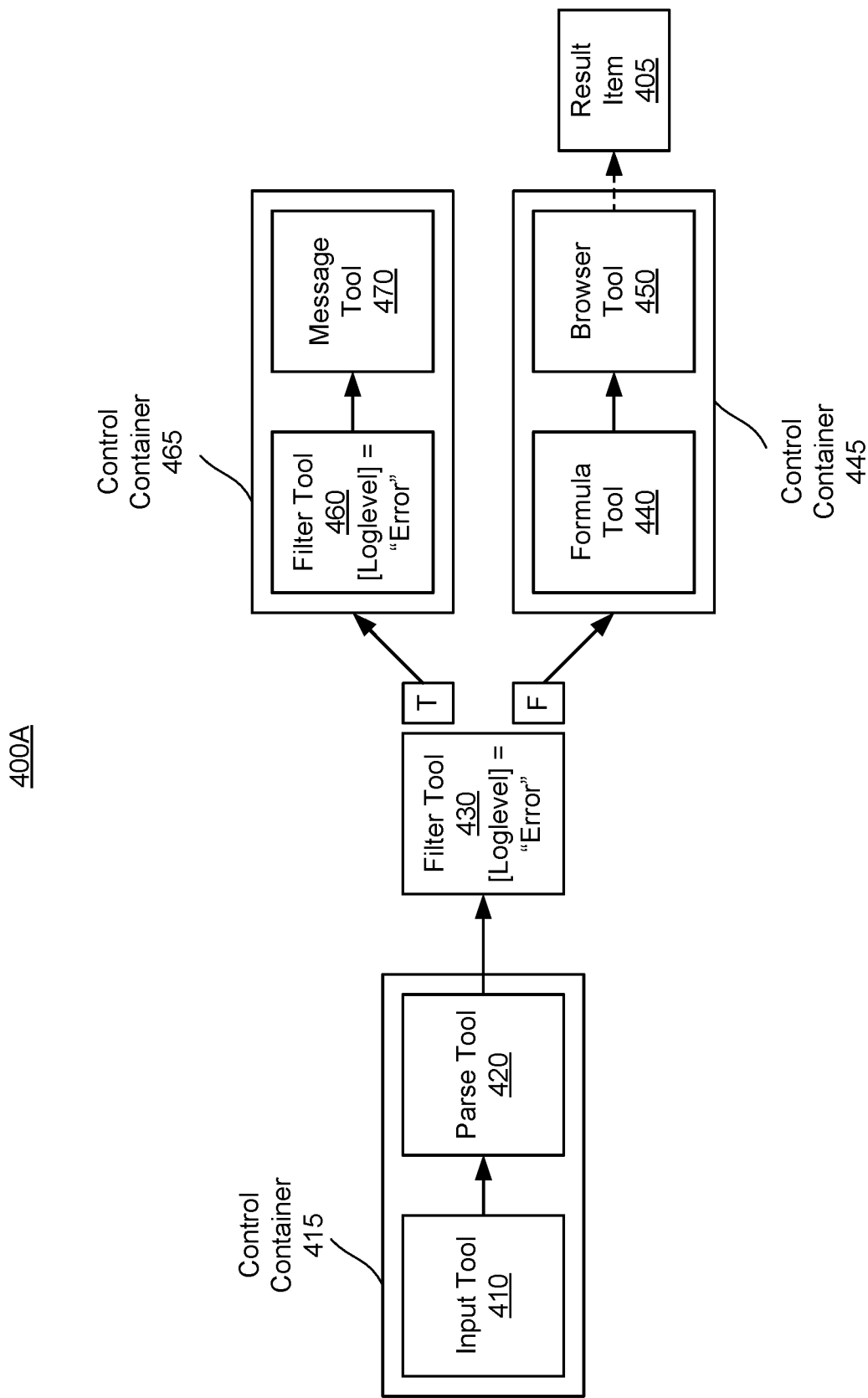
FIGS. 4A-B are schematic diagrams illustrating an analytics workflow integrated with logic control according to various embodiments.
Figure 4B:
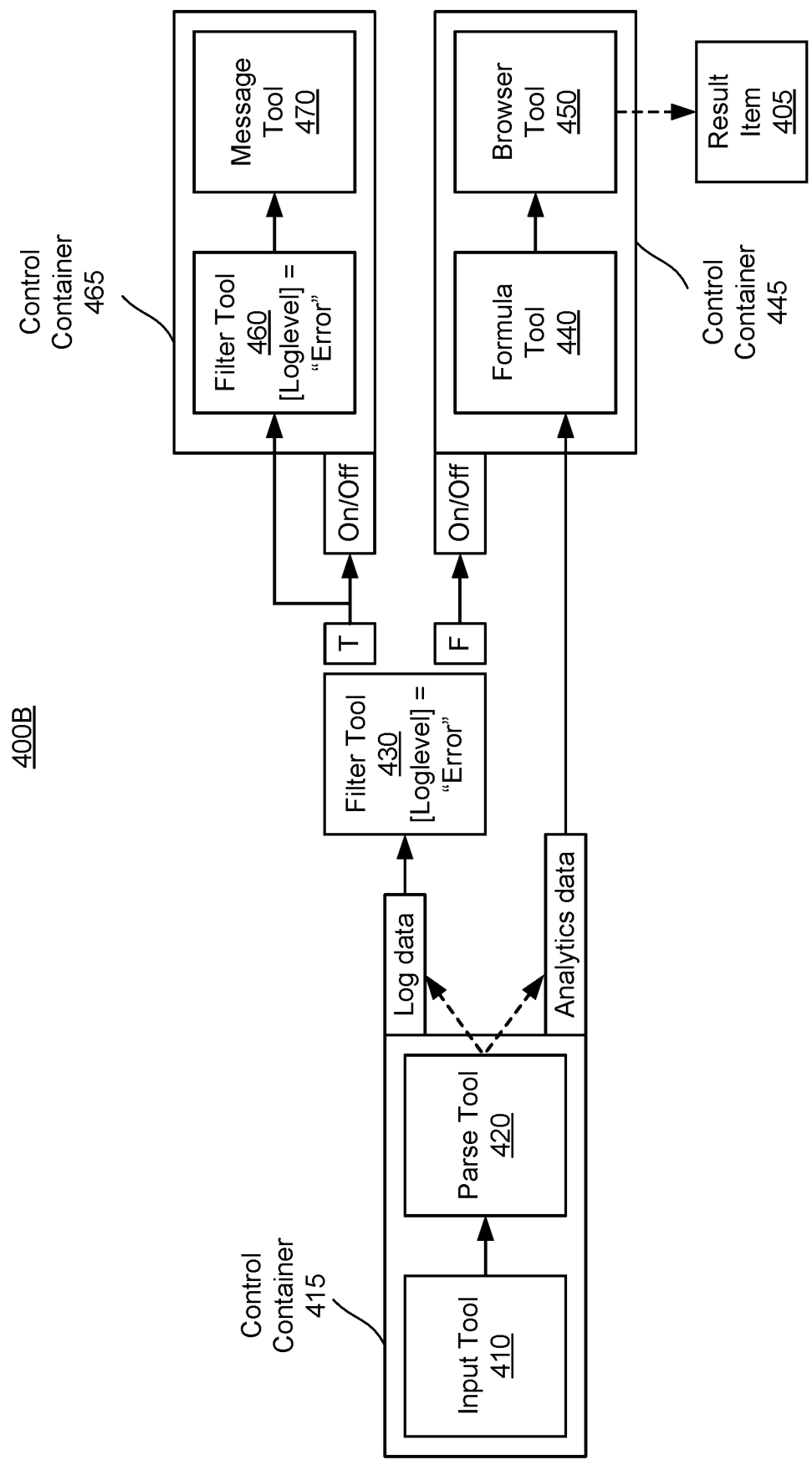

The environment also facilitates creation of logic-controlled workflows, such as the workflow illustrated in FIG. 4A and FIG. 4B. A logic-controlled workflow is a workflow that includes a sequence of tools integrated with one or more logic controllers. A logic controller has a logical function and is adapted to determine whether to (and/or not to) trigger a tool based on an input. The data analytics application 150 uses the sequence of tools to process data files and uses the logic controllers to control operations of tools in the sequence during the processing of the data files. In some embodiments, a logic controller is associated with at least two tools in the workflow: a first tool and a second tool subsequent to the first tool in the sequence. The data analytics application 150 applies a logging function onto the first tool to log events occurring during the performance of the data analytics function of the first tool in the processing of the data file. The log data generated by the first tool describe activities performed and/or events detected by the first tool during its processing of the data file. The events may be, e.g., errors detected during the performance of the data analytics function of the tool, warning generated during the performance of the data analytics function of the tool, number of records processed by the tool, output of the metadata file, completion of the performance of the data analytics function of the tool, and so on. The first tool also outputs analytics data, e.g., in a metadata file. The analytics data are generated by the first tool from the performance of its data analytics function in the processing of the data file.

The data analytics application 150 uses the log data and/or analytics data generated by the first tool as input for the logic controller. For instance, the logic controller can analyze the log data to detect an event described by the log data and to determine whether to trigger the second tool based on the detected event. In some embodiments, the logic controller is a data analytics tool with a logical function. The tool in the logic controller performs a data analytics function on the log to detect the events logged by the first tool. The logical function outputs a command based on the output of the tool in the logic controller. The second tool is adapted to receive the command and to process data in accordance with the command.

For example, in response to detecting a successful completion of the data analytics function of the first tool, the logic controller triggers the second tool to operate. In some embodiments, the logic controller receives the metadata file from the first tool and sends the metadata file to the second tool in response to a determination of triggering the second tool. The second tool, receiving the metadata file from the logic controller, process the metadata file. The logic controller may selectively execute other tools in the workflow based on the log generated by the first tool. Tools subsequent to the second tool, if any, also operate to perform their data analytics functions and to finish the processing of the data file. A result item representing an outcome of the processing of the data file by the sequence of tools is generated. The data analytics application 150 provides the result item for display to a user.

As another example, the logic controller does not trigger the operation of the second tool in response to detecting an error that occurred during the operation of the first tool. In some embodiments, in response to determining not to trigger the operation of the second tool, the logic controller triggers an operation of a third tool. The third tool may not be in the sequence. The third tool is adapted to generate a supplemental result item. In one example, the supplemental result item is a message specifying an event that occurred during the operation of the first tool, based on which the logic controller has determined not to trigger the data analytics function of the second tool. The third tool generates the message based on information of the event from the logic controller and can send the message to a client device associated with the user. In some embodiments, the data analytics application 150 receives from the user an action to address the event. The data analytics application 150 may resolve the event based on the user's action. In response to resolving the user's action, the data analytics application 150 may instruct the logic controller to trigger the second tool to finish the processing of the data file.

The examples are provided for the purpose of illustration. The logic controller can detect other types of logged events. Also, the logic controller can control execution of other tools. For example, the logic controller may determine to (or not to) trigger one or more other tools in addition to determining to trigger the second tool. The one or more other tools may be connected to the second tool, e.g., in the same order as they are arranged in the sequence of tools. Similarly, the logic controller may determine to (or not to) trigger one or more other tools in addition to determining not to trigger the second tool. Further, the logic controller can receive log generated by one or more other tools in addition to the first tool as input and use the input.

The logic-controlled workflow generated by the data analytics application 150 is advantageous as it allows users to monitor and control the data analytics process. By using such logic-controlled workflow, the data analytics process can be paused at the first tool after a negative event (i.e., an event based on which the logic controller determines not to trigger the second tool). The negative event can cause the data generated by the first tool to be improper for further processing. For instance, the first tool can stop processing the data file when an error occurs so that the data generated by the first tool is incomplete. Thus, the pause of the data analytics process avoids wasting computing resources to process the improper data by the other tools. Also, users can add the third tool to the workflow so that they can be informed of the negative event through the supplemental result item. This way, the users get a chance to resolve the negative event and resume the data analytics process. Compared with conventional data analytics technologies, the logic-controlled workflow facilitates user contributions to data analytics processes and saves computing resources that would have been wasted on processing improper data.

In some cases, the data analytics application 150 provides software that supports networked, or cloud-based, access to data analytic tools and macros to multiple end users. As an example, the data analytics application 150 supports creation of workflows in a manner of dashboard, web application, mobile application, etc. As another example, the data analytics application 150 allows users to share, browse and consume analytics in a manner similar to a mobile application store or other cloud-based service. Analytic data, macros and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics application 150 can perform functions associated with analytic apps such as creating, deploying, publishing, iterating, updating and the like.

Additionally, the data analytics application 150 can support functions performed at various stages involved in data analytics, such as the ability to access, prepare, blend, analyze, and output analytic results. In some cases, the data analytics application 150 can access the various data sources, retrieving raw data, for example, in a stream of data. Data streams collected by the data analytics application 150 can include multiple records of raw data, where the raw data is in differing formats and structures. After receiving at least one data stream, the data analytics application 150 can perform operations to allow records of the data stream to be used as an input into data analytic operations. Moreover, analytic functions involved in statistical, qualitative, or quantitative processing of records, such as predictive analytics (e.g., predictive modelling, clustering, data investigation) can be implemented by data analytics application 150.

As mentioned above, the data sources 120 provide electronic data to the data analytics system 110. A data source 120 may be a computer, a database, a network API (application programming interface), or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130. The data provided the data sources 120 is typically organized into data records, which each data record including one or more values. For example, a data record provided by a data source may include a series of comma-separated values. The data describes information of relevance to an enterprise using the data analytics system. For example, data from a data source 120 can describe computer-based interactions (e.g., click tracking data) with content accessible on websites and/or with social media applications.

The network 130 represents the communication pathways between the data analytics system 110 and the data sources 120. In one embodiment, the network 130 is the Internet and uses standard communications technologies and/or protocols. The data exchanged over the network 130 can be represented using technologies and/or formats including the hypertext markup language (HTML), the extensible markup language (XML), etc. In another embodiment, the entities can use custom and/or dedicated data communications technologies instead of, or in addition to, the ones described above.

FIG. 2 is a block diagram illustrating a workflow 200 created using the data analytics system 110 to process data according to one embodiment. The workflow 200 is executed by a computer device of the data analytics system 110. However, in other embodiments, the workflow 200 is deployed to another computer device that may be communicatively connected, via a network (e.g., the network 130), to the data analytics system 110.

A workflow can include a series of tools that perform specific processing operations or data analytics functions. The tools are arranged in an order. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. A record, including an aggregated group of individual records, can be passed through the tools of a workflow, which allows for the individual processing operations to operate more efficiently on the data. Such data aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools can execute in parallel.

As illustrated, the workflow 200 of FIG. 2 includes input/output tools, illustrated as input tools 205 and 206, and browse tool 230. The input tools 205 and 206 function to access records from particular data sources 120. The inputs tools 205 and 206 bring into the workflow the accessed records and provide the records to the subsequent tools of the workflow 200. In this example, the input tool 205 provides accessed records to a filter tool 210 and the input tool 206 provides accessed records to a select tool 211. The browse tool 230 is located at the end of the workflow 200 and receives the output resulting from the execution of each of the upstream tools of the workflow 200. Although the browse tool 230 is located at the end of the workflow 200 in this example, the browse tool 230 can be added at any point in a workflow to review and verify results from execution of upstream tools of the workflow.

In continuing with the example of FIG. 2, the workflow 200 includes preparations tools, shown as the filter tool 210, the select tool 211, a formula tool 215, and a sample tool 212. The filter tool 210 queries records based on an expression and splits the data into two streams, a true stream that includes records that satisfy the expression and a false stream that includes records that do not satisfy the expression. The select tool 211 can be used to select, deselect, re-order and rename fields, change field type or size, and assign a description. The formula tool 215 creates or updates fields using one or more expressions to perform a broad variety of calculations and/or operations. The sample tool 212 limits a received stream of records to a number, percentage, or random set of records.

The workflow 200 also includes a join tool 220 that blends multiple data sources. Specifically, the join tool 220 combines two input data streams based on common fields (or record position). The workflow 200 of FIG. 2 is also shown to include a summarize tool 225 which is a parse and transform tool that can restructure and re-shape data to a format used in further analysis. The summarize tool 225 can also perform summarization of data by grouping, summing, counting, spatial processing, and string concatenation. In one embodiment, the output generated by the summarize tool 225 contains the results of the calculation(s).

In some embodiments, execution of the workflow 200 will cause the input tool 205 to pass records one at a time through the filter tool 210 and the formula tool 215, until all records are processed and have reached the join tool 220. Thereafter, the input tool 206 will begin passing records one at a time through the select tool 211 and sample tool 212, until the records are passed to the same join tool 220. Some individual tools of the workflow 200 may implement their own parallel operations, such as initiating a read of a block of data while processing the last block of data or breaking computer-intensive operations, such as a sort tool, into multiple parts.

Figure 3:
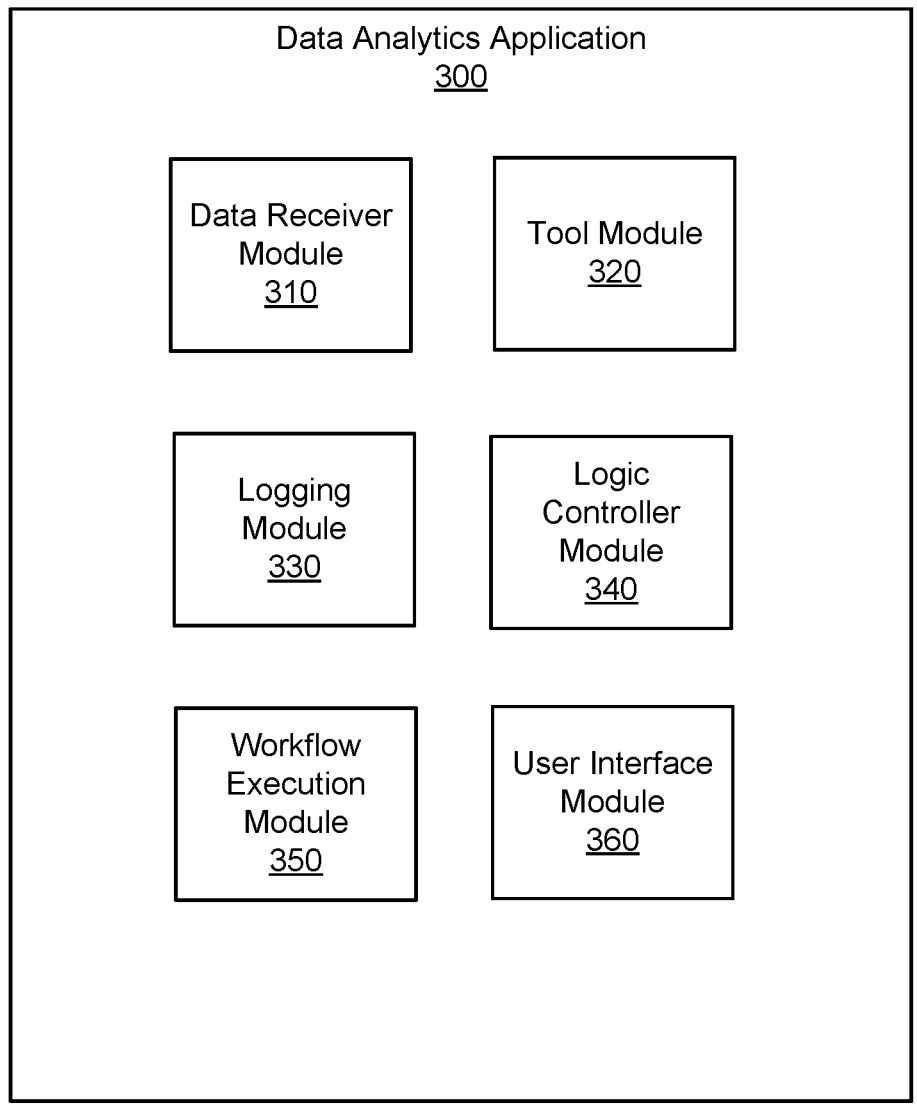
FIG. 3 is a block diagram illustrating a data analytics application according to one embodiment.

FIG. 3 is a block diagram illustrating a data analytics application 300 according to one embodiment. The data analytics application 300 facilitates creation and execution of logic-controlled workflows. The data analytics application 300 is an embodiment of the data analytics application 150 in FIG. 1. In the embodiment of FIG. 3, the data analytics application 300 includes a data receiver module 310, a tool module 320, a logging module 330, a logic controller module 340, a workflow execution module 350, and a user interface module 360. Those of skill in the art will recognize that other embodiments can have different and/or other components than the ones described here, and that the functionalities can be distributed among the components in a different manner. For instance, some or all functions of the data analytics application 300 may be performed at a client device or a third-party server.

The data receiver module 310 receives data files from data sources, e.g., the data sources 120, and provides the data files to other modules in the data analytics application 300. In one embodiment, the data receiver module 310 serves as the interface between the tools in the data analytics application, such as the input tools 206 illustrated in FIG. 2. In another embodiment, the data receiver module 310 is absent and the function of the data receiver module 310 is performed by the tools.

The tool module 320 provides a set of tools for creating workflows. Each tool performs a specific data analytics function and generates data from the performance of its data analytics function. The data represents an outcome of the performance of the data analytics function of the tool. In some embodiments, the tool module 320 provide the tools included in the workflow 200 described in conjunction with FIG. 2. One or more tools of the tool module 320 may execute in parallel while processing data records for a workflow. A tool may run as multiple separate threads, with each thread operating on a separate core of the processor of the data analytics system 110. For example, an embodiment of the join tool distributes tasks associated with the join operation to multiple threads to leverage the parallel processing capabilities of the processor. A tool creates tasks to execute its operations. An operation of a tool includes one or more tasks. Each task is assigned to a thread of the tool for being performed by the thread.

In some embodiments, the set of tools are provided in a user interface (e.g., a GUI) supported by the user interface module 360. Each tool has an icon indicating the data analytics function of the tool. The user interface allows a user, e.g., a workflow designer, to select tools and define relationships (e.g., logical relationship or sequential relationship) between the selected tools to create a workflow. The user interface may provide a description of each tool, e.g., including information describing the data analytics function of the tool, that helps the designer to under the functions of the tools.

The logging module 330 provides logging functions to the tools. A logging function, when applied to a tool, cause the tool to log events occurring during performance of the data analytics function of the tool. Examples of the events include an error detected during the performance of the data analytics function of the tool, a warning message generated by the tool, one or more data records that have been processed by the tool, an output of a result of the performance of the data analytics function of the tool, completion of the performance of the data analytics function of the tool, or some combination thereof. The logging function can cause the tool to generate a log file including data describing the events. For instance, the log file includes information describing a detected error, such as a time stamp associated with the error, an identification of a data record where the error was detected, a cause for the error, etc. As another example, the log file includes information indicating a successful completion of the performance of the data analytics function of the tool, such as information indicating the last data record in the data file has been processed, a close command associated with the tool, and so on. The log file may include a plurality of records, each of which corresponds to an event.

In some embodiments, the logging module 330 provides one or more logging containers in a user interface (e.g., a GUI) supported by the user interface module 360. A logging container can be applied to one or more tools to provide a logging function to the tools. The user interface can be the same user interface providing the set of tools. The user interface allows a user, e.g., a workflow designer, to select a logging container and apply the selected logging container to one or more tools. The user interface may also allow the user to remove the logging container from the one or more tools.

The logic controller module 340 provides logic controllers for creating logic-controlled workflows. A logic controller is adapted to determine whether to trigger a tool based on an input. In some embodiments, the logic controller is associated with two tools in a sequence. The logic controller receives a log file generated by the precedent tool as an input, processes data in the log file to detect events logged by the precedent tool, and determines, based on the result of the processing, whether to instruct the subsequent tool to perform its data analytics function on an output of the precedent tool. The output of the precedent tool is the result of the performance of data analytics function of the precedent tool on a data file. The logic controller may receive the output of the precedent tool. In some embodiments, the logic controller determines whether to trigger the subsequent tool based on the output of the precedent tool in lieu of or in additional to the log file. In some embodiments, responsive to determining to trigger the subsequent tool, the logic controller generates a command instructing the subsequent tool to perform its data analytics function and may send the command and the output of the precedent tool to the subsequent tool. In some embodiments, a logic controller is a data analytics tool integrated with logical functions. The data analytics tool performs a data analytics function on the log file generated by the precedent tool, the data file, the output of the precedent tool, or a combination thereof. The data analytics tool may be integrated in the sequence of tool, e.g., placed between the precedent tool and the subsequent tool.

The logic controller may be associated with a third tool. The third tool may be in the sequence and subsequent to the precedent tool. Alternatively, the third tool is not in the sequence. Responsive to determining not to trigger the subsequent tool, the logic controller may determine to trigger the third tool. For instance, the logic controller generates a command instructing the third tool to perform its function. The logic controller may send the log file form the precedent tool to the third tool. The third tool performs its function on the log file and generates a result item, e.g., a chart, a message, etc. The third tool can send the result item to another component of the data analytics application 300 (e.g., the user interface module 360 for providing the result item for display in a user interface supported by the user interface module 360) or to another device (e.g., a client device associated with the user.) In some embodiments, the result item generated by the third tool describes an event in the log file, the event which causes the logic controller to determine not to trigger the subsequent tool.

In some embodiments, the logic controller module 340 provides one or more control containers in a user interface (e.g., a GUI) supported by the user interface module 360. A control container can be applied to one or more tools to provide a logical function to the tools. For instance, the control container can be placed in the GUI to enclose the one or more tools. The user interface can be the same user interface providing the set of tools and the logging containers. A control container may also have logging function, in which case logging containers are not needed. The user interface allows the user to select a control container and apply the selected control container to one or more tools. The user interface may also allow the user to remove the control container from the tools. A control container, when applied to a tool, operates as a logic controller for the one or more tools. For instance, the control container triggers the one or more tools upon receiving input and does not trigger the one or more tools when it does not receive any input. In some embodiments, the control containers have an on/off input and a data input. When the control container receives data through the on/off input, the control container triggers the one or more tools to process the data received through the data input. Conversely, if the control container does not receive data through the on/off input, the control container does not trigger the one or more tools and the data received through the data input (if any) is ignored or deleted.

The workflow execution module 350 facilitates execution of workflows (including logic-controlled workflows). The workflow execution module 350 receives data files from the data receiver module 310 and sends the data files to workflows. Execution of the workflows generates result items. A result item generated by a workflow represents an outcome of the processing of the data file by the sequence of tools in the workflow. A logic-controlled workflow includes one or more logic controllers in addition to a sequence of tools. Execution of the logic-controlled workflow may generate a supplemental result item in addition or alternative to the result item representing the outcome of the processing of the data file by the sequence of tools. The supplemental result item includes information describing events occurred during the processing of the data file, e.g., event occurred during the performance of the data analytics function of a tool associated with the logic controller. The logic-controller workflow allows users to control the data processing by the workflow through the logic controller. Also, through the supplemental result item, the user can be informed by events occurred during the data processing, such as events that prevent successful completion of the data processing. That way, the user can take actions accordingly to address the events and to achieve successful completion of the data processing.

In some embodiments, the workflow execution module 350 provides a logic-controlled workflow to a client device for processing the data file on the client device. In some other embodiments, the workflow execution module 350 provides the logic-controlled workflow to a third-party server (e.g., a server running in the cloud) communicating with a client device and the data file is processed on the third-party server by using the logic-controlled workflow. The workflow execution module 350 can facilitates execution of the logic-controlled workflow on the client device or the third-party server.

FIG. 4A is a schematic diagram illustrating a workflow 400A integrated with logic control according to one embodiment. The workflow 400A is adapted to processes a data file and to generates a result item 405 that represents an outcome of the data processing. The workflow 400A includes a sequence of tools: an input tool 410, a parse tool 420, a filter tool 430, a formula tool 440, a browser tool 450, another filter tool 460, and a message tool 470. The workflow 400A also includes three control containers 415, 445 and 465 that provide logic control. Thus, the workflow 400A is a logic-controlled workflow. In other embodiments, the workflow 400A may include different tools, different logic controllers, or both.

The control container 415 may receive input data (e.g., in the form of an input file) to be processed by a parsing tool. The control container 415 is associated with the input tool 410 and the parse tool 420. The input tool 410 receives a data file, e.g., from a data source 120 illustrated in FIG. 1. The input tool 410 sends the data file to the parse tool 420. The parse tool 420 parses data in the data file, e.g., by converting a data type of the data file to a different data type, and generates analytics data. The parse tool 420 also logs events that occurred during the parsing and generates log data. The analytics data and log data may be in separate files, e.g., a metadata file and a log file, respectively, or in the same file. The parse tool 420 sends the analytic data and log data to the filter tool 430.

The filter tool 430 is a logic controller. It processes the log data from the parse tool 420. In the embodiment of FIG. 4, the filter tool 430 uses the word "error" as a filtering parameter and filters a "Loglevel" column in the log data to determine whether an error was detected during the parsing by the parse tool 420. For instance, the filter tool 430 processes records in the log data. The filter tool 430 is associated with a true side, which is represented by the "T" icon in FIG. 4A, and a false side, which is represented by the "F" icon in FIG. 4A. The filter tool 430 passes records meeting the filtering parameter (i.e., records indicating error was detected) to the true side and passes records not meeting the filtering parameter (i.e., records indicating error was not detected) to the false side.

The false side of the filter tool 430 is connected to the control container 445. The control container 445 is associated with the formula tool 440 and the browser tool 450 and can trigger the formula tool 440 and the browser tool 450 upon receiving input. For instance, the control container 445 receives records from the filter tool 430 after the filter tool 430 passes the records to the false side. In response to receiving a record from the filter tool 430, the control container 445 triggers the formula tool 440 and the browser tool 450. The formula tool 440 receives the analytics data generated by the parse tool 420, e.g., through the filter tool 430, and converts the analytics data to new analytics data by applying a formula on the analytics data. The browser tool 450 receives the new analytics data from the formula tool 440 and generates a result item representing the new analytics data. The result item may be a graphical representation of the new data, such as a chart or a diagram. In various embodiments where the control container 445 receives no data from the filter tool 430, the control container 445 does not trigger the formula tool 440 and the browser tool 450. The formula tool 440 or the browser tool 450 does not perform its data analytics function. The formula tool 440 may still receive the analytics data generated by the parse tool 420 even though it does not run.

The true side of the filter tool 430 is connected to the control container 465. The control container 465 is associated with the filter tool 460 and the message tool 470 and can trigger the filter tool 460 and the message tool 470 upon receiving input. For instance, the control container 465 receives records from the true side of the filter tool 430 after the filter tool 430 passes the records to the true side. In response to receiving a record from the filter tool 430, the control container 465, the control container 465 triggers the filter tool 460, which is placed inside the control container 465.

The filter tool 460 receives the log data generated by the parse tool 420, e.g., through the filter tool 430 and/or the control container 465. Similar to the filter tool 430, the filter tool 460 uses the word "error" as a filtering parameter and filters a "Loglevel" column in the log file to determine whether an error was detected during the parsing by the parse tool 420. The purpose of the filter tool 460 is to confirm that an error was really logged by the parse tool 420. The filter tool 460 performs the filtering on the log data and outputs data representing a result of the filtering. The filter tool 460 sends the data to the message tool 470. The message tool 470 generates a message describing the error based on the data from the filter tool 460. The message may include a time stamp indicating when the error was occurred, a character of the error, a data record in the data file where the error occurred, etc. The message tool 470 can send the message to a user, e.g., by sending the message to a client device of the user, an email account of the user, etc. The user, after receiving the message, may take actions to fix the error. After the error is fixed, the formula tool 440 can be triggered, e.g., by the controller container. In various embodiment where the control container 465 receives no data from the filter tool 430, the filter tool 460 and message tool 470 are not triggered and will not run.

FIG. 4B is a schematic diagram illustrating a workflow 400B integrated with logic control according to one embodiment. In the workflow 400B of FIG. 4B, the filter tool 430 processes the log data from the parse tool 420 and outputs the log data through either the true side (represented by the "T" icon) or the false side (represented by the "F" icon). The true side of the filter tool 430 is connected to control container 465, and the false side of the filter tool 430 is connected to the control container 445. In some embodiments, the true side of the filter tool 430 is connected to an on/off input of the control container 465 that controls whether the control container 465 is turned on or off. If data is received through the on/off input of the control container 465, the control container (and the tools within the control container 465) are turned on. Alternatively, if data is not received through the on/off input of the control container 465, the control container is turned off. Similarly, the false side of the filter tool 430 is connected to an on/off input of the control container 445. If data is received through the on/off input of the control container 445, the control container 445 is turned on; and if data is not received through the on/off input of the control container 445, the control container 445 is turned off.

In the example of FIG. 4B, if the Loglevel column of an entry in the log data matches the word "Error," the filter tool 430 outputs the entry through the true side and provides the entry to the control container 465. Thus, if the Loglevel column of the entry in the log data matches the word "Error," the control container 465 receives the entry through the on/off input, turning the control 465 container on. In contrast, if the Loglevel column of the data entry in the log data does not match the word "Error," the filter tool 430 outputs the entry through the false side and provides the entry to the control container 445. Thus, if the Loglevel column of the entry in the log data does not matches the word "Error," the control container 445 receives the entry through the on/off input, turning the control container 445 on.

The control container 445 additionally receives the analytics data outputted by the parse tool 420 through a data input. If the control container 445 is turned on, in response to receiving a record from the analytics data, the control container 445 triggers the formula tool 440 and the browser tool 450. However, if the control container is turned off (e.g., if the control container had not received data from the filter tool through the on/off input), even if the control container 445 receives a record from the analytics data outputted by the parse tool 420, the control container 445 does not trigger the formula tool 440 or the browser tool 450.

In some embodiments, the control container 465 receives the output of the filter tool 430 through a data input. If the control container 465 is turned on (i.e., if the control container 465 received an entry through the on/off input), the control container 465 triggers the filter tool 460 and the message tool 470 to process the entry outputted through the true side of the filter tool 430. For example, the control container 465 triggers the message tool 470 to generate a message describing the error based on the data received from the filter tool 430.

Figure 5:
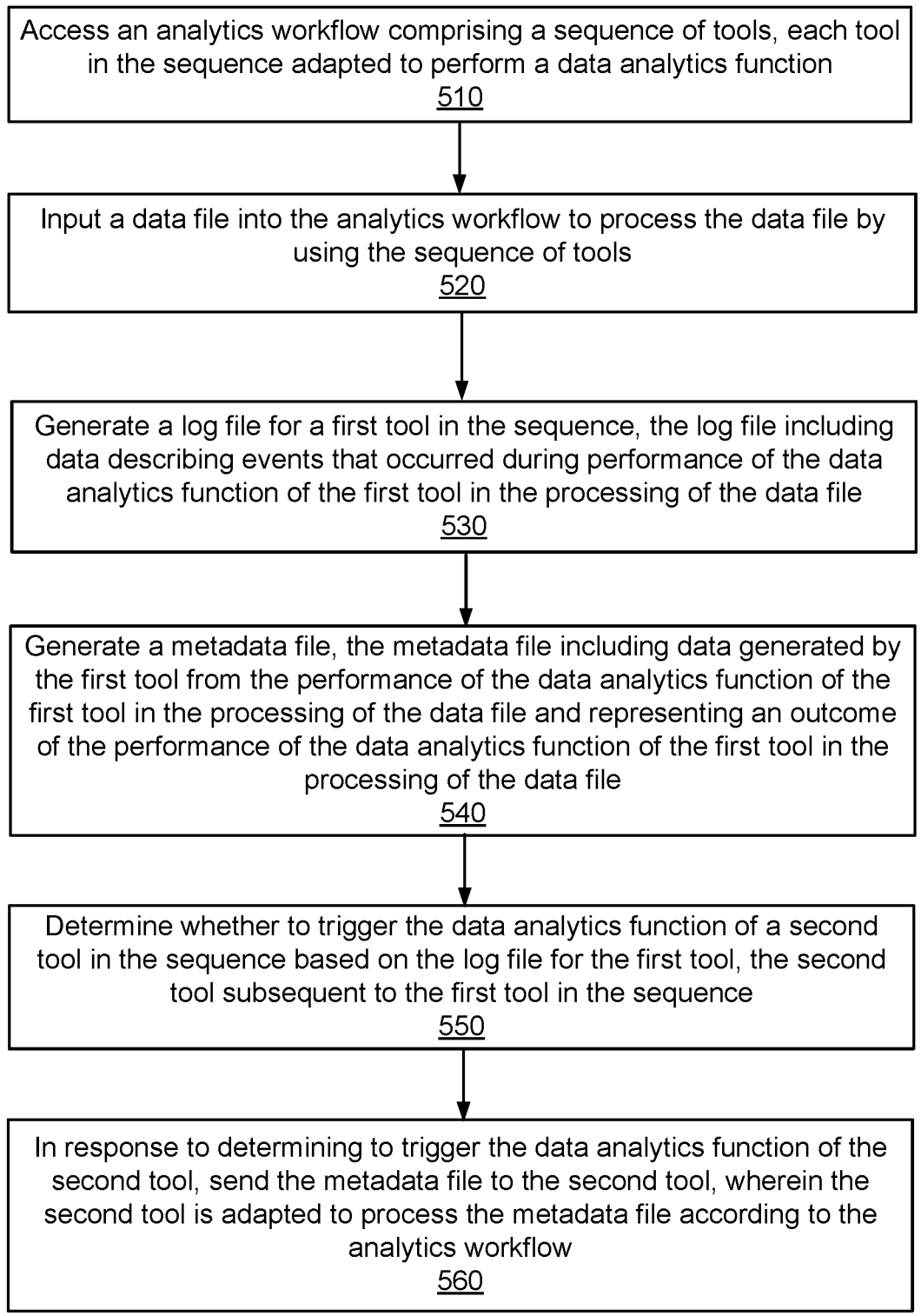
FIG. 5 is a flow chart illustrating a process of processing a data file by using an analytics workflow integrated with logic control according to one embodiment.

FIG. 5 is a flow chart illustrating a process of processing a data file by using an analytics workflow integrated with logic control according to one embodiment. In some embodiments, the process is performed by the data analytics application 150, although some or all of the operations in the process may be performed by other entities in other embodiments. In some embodiments, the operations in the process are performed in a different order and can include different and/or additional steps.

The data analytics application 150 accesses 510 an analytics workflow. The analytics workflow comprises a sequence of tools. Each tool in the sequence is adapted to perform a data analytics function, such as input, output, preparation, join, predictive, spatial, investigation, parse, transform, and so on. The analytics workflow is a logic-controlled workflow and further includes one or more logic controllers.

The data analytics application 150 inputs 520 a data file into the analytics workflow to process the data file by using the sequence of tools. The data analytics application 150 generates 530 a log file for a first tool in the sequence. The log file includes data describing events that occurred during performance of the data analytics function of the first tool in the processing of the data file. For instance, the log file includes information describing an error that occurred during the performance of the data analytics function of the first tool, a warning message generated by the first tool, information indicating a count of records processed by the first tool, information indicating an output of a result of the performance of the data analytics function of the first tool, information indicating completion of the performance of the data analytics function of the first tool, or some combination thereof.

The data analytics application 150 generates 540 a metadata file. The metadata file includes data generated by the first tool from the performance of the data analytics function of the first tool in the processing of the data file. The metadata file represents an outcome of the performance of the data analytics function of the first tool in the processing of the data file. In an example where the first tool is a formula tool adapted to apply an algorithm on data to generate new data, the metadata file includes the new data generated by the formula tool by applying the algorithm. In another example where the first tool is a filter tool adapted to select data based on a filtering parameter, the metadata file includes the data selected by the filter tool based on the filtering parameter.

The data analytics application 150 determines 550 whether to trigger the data analytics function of a second tool in the sequence based on the log file for the first tool. The second tool is subsequent to the first tool in the sequence. In some embodiments, the logic controller in the analytics workflow analyzes the log file to detect one or more events described in the log file. The logic controller then determines whether the second tool should be triggered based on the detected events. In an example the logic controller detects a successful completion of the first tool's data analytics function performed on the data file, the logic controller generates a command instructing the second tool to perform its data analytics function on the metadata file for the first tool. The command may be sent to the second tool along with the metadata file. In another example where the logic controller detects an error that occurred during the first tool's processing of the data file, the logic controller determines that the second tool should not be triggered. The logic controller may put the second tool on hold or take no action.

In some embodiments, the logic controller, responsive to a determination of not triggering the second tool, determines to trigger an operation of a third tool. The third tool may not be in the sequence of the workflow. The logic controller may generate a command instructing the third tool to operate based on the log file. The data analytics application 150 may process the log file by using the third tool to generate a supplemental result item. The supplemental result item represents an outcome of the processing of the log file by the third tool. The supplemental result item may be a chart showing the event described in the log file, message describing the event described in the log file, or other types of items associated with the event described in the log file. The data analytics application 150 provides the supplemental result time to a client device associated with a user and may receive the user's action to resolve the event. The data analytics application 150 resolves the event based on the user's action. In response to the event is resolved, the data analytics application 150 determines to trigger performance of the data analytics function of the second tool on the metadata file for the first tool. In the example where the logic controller detects an error from the log file, the logic controller can instruct the third tool to generate an error message for sending to the client device to notify the user of the error. The data analytics application 150 receives the user's action to fix the error. The data analytics application 150 may fix the error based on the user's action and then determines to trigger the data analytics function of the second tool.

In response to determining to trigger the data analytics function of the second tool, the data analytics application 150 sends 560 the metadata file to the second tool. The second tool is adapted to process the metadata file according to the analytics workflow. In some embodiments, the data analytics application 150 processes the metadata file by using a subset of the sequence of tools to generate a result item. The subset of the sequence of tools starts with the second tool and may include one or more other tools in the sequence that are subsequent to the second tool. The result item represents an outcome of the processing of the data file by the sequence of tools.

Figure 6:
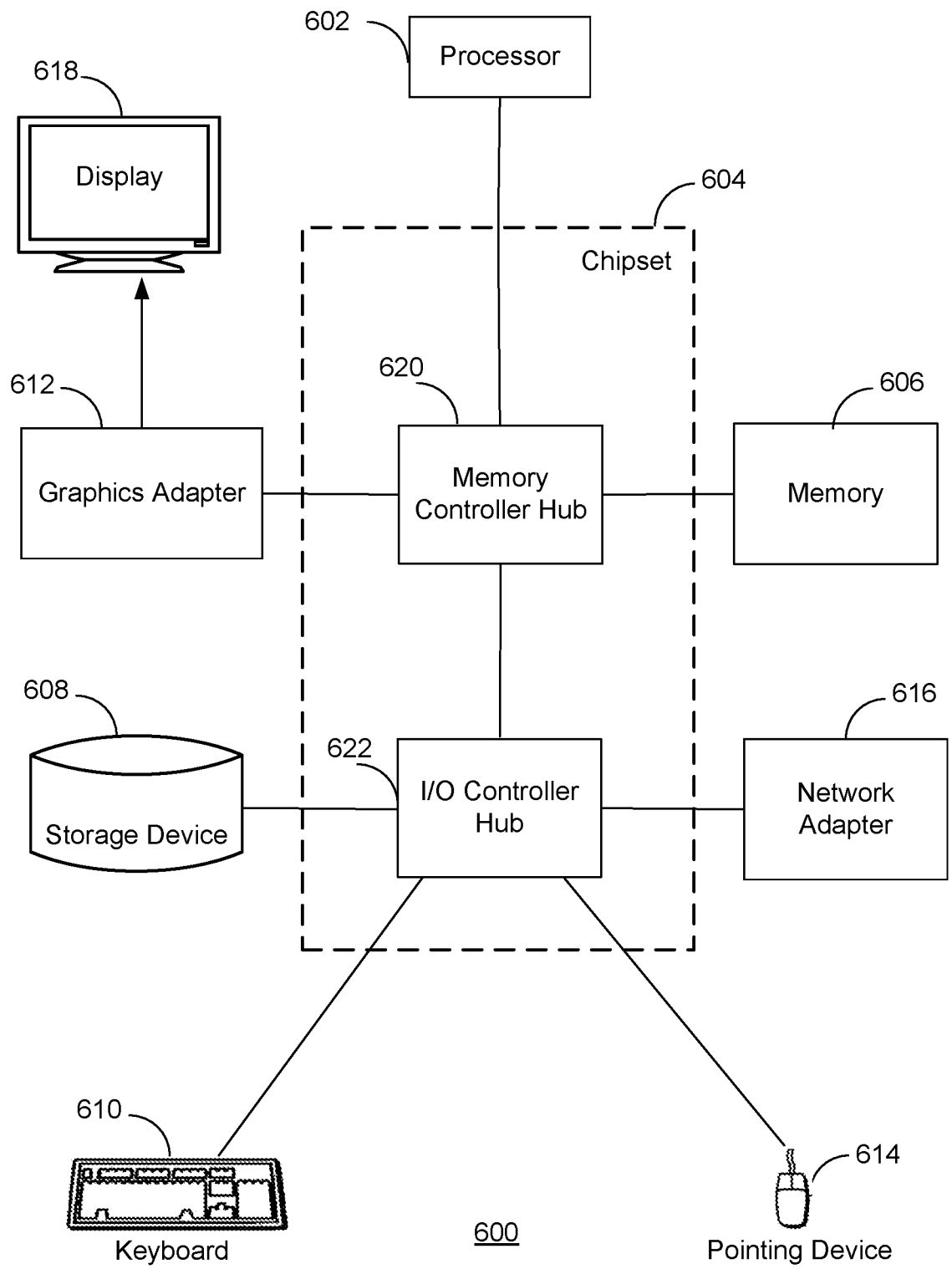
FIG. 6 is a high-level block diagram illustrating a functional view of a typical computer system for use as the data analytics system of FIG. 1 according to one embodiment.

FIG. 6 is a high-level block diagram illustrating a functional view of a typical computer system 600 for use as the machine learning server 110 of FIG. 1 according to an embodiment.

The illustrated computer system includes at least one processor 602 coupled to a chipset 604. The processor 602 can include multiple processor cores on the same die. The chipset 604 includes a memory controller hub 620 and an input/output (I/O) controller hub 622. A memory 606 and a graphics adapter 612 are coupled to the memory controller hub 620 and a display 618 is coupled to the graphics adapter 612. A storage device 608, keyboard 610, pointing device 614, and network adapter 616 may be coupled to the I/O controller hub 622. In some other embodiments, the computer system 600 may have additional, fewer, or different components and the components may be coupled differently. For example, embodiments of the computer system 600 may lack displays and/or keyboards. In addition, the computer system 600 may be instantiated as a rack-mounted blade server or as a cloud server instance in some embodiments.

The memory 606 holds instructions and data used by the processor 602. In some embodiments, the memory 606 is a random-access memory. The storage device 608 is a non-transitory computer-readable storage medium. The storage device 608 can be a HDD, SSD, or other types of non-transitory computer-readable storage medium. Data processed and analyzed by the machine learning server 110 can be stored in the memory 606 and/or the storage device 608.

The pointing device 614 may be a mouse, track ball, or other type of pointing device, and is used in combination with the keyboard 610 to input data into the computer system 600. The graphics adapter 612 displays images and other information on the display 618. In some embodiments, the display 618 includes a touch screen capability for receiving user input and selections. The network adapter 616 couples the computer system 600 to the network 160.

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer-implemented method, comprising:
    accessing an analytics workflow including a parsing tool, a filter tool, an error container including one or more error tools, and a no error container including a plurality of tools;
    generating a log file and a metadata file by inputting a data file to the parsing tool, the log file including data describing events occurring during the parsing tool processing the data file using one or more data analytics functions, the metadata file including analytics data generated from the parsing tool processing the data file using the one or more data analytics functions and representing an outcome of the one or more data analytics functions;
    determining, by inputting the log file to the filter tool, whether the log file includes at least one entry indicating an error occurred during the parsing tool processing the data file; and
    responsive to determining that the log file includes at least one entry indicating the error:
        generating a message that describes the error that occurred during the parsing tool processing the data file, wherein generating the message is performed without processing the metadata file using the plurality of tools of the no error container; and
        displaying the message in a user interface; or
    responsive to determining that the log file does not include at least one entry indicating the error:
        generating additional analytics data by inputting the metadata file to at least one of the plurality of tools of the no error container, wherein generating the additional analytics data is performed without processing the log file using the one or more error tools of the error container; and
        presenting the additional analytics data in the user interface.

2. The computer-implemented method of claim 1, wherein the no error container is implemented by a processor of a computing device, wherein generating the message is performed without providing power to the processor implementing the no error container.

3. The computer-implemented method of claim 1, wherein the error container is implemented by a processor of a computing device, wherein generating the additional analytics data is performed without providing power to the processor implementing the error container.

4. The computer-implemented method of claim 1, wherein generating the additional analytics data comprises generating at least one of a chart or a graph that depicts analytics derived from processing the metadata file using the at least one of the plurality of tools of the no error container.

5. The computer-implemented method of claim 1, wherein determining whether the log file includes at least one entry indicating the error is performed while the parsing tool is processing the data file, the computer-implemented method further comprising pausing processing of the data file by the parsing tool until the error is resolved.

6. The computer-implemented method of claim 5, further comprising:
receiving input at the user interface displaying the message, the input indicating that the error is resolved; and
resuming processing of the data file by the parsing tool responsive to receiving the input.

7. The computer-implemented method of claim 1, wherein generating the additional analytics data by inputting the metadata file to the at least one of the plurality of tools of the no error container is performed in parallel while the parsing tool is processing the data file.

8. A system comprising:
one or more processors; and
a computer-readable storage medium storing instructions that are executable by the one or more processors to perform operations comprising:
accessing an analytics workflow including a parsing tool, a filter tool, an error container including one or more error tools, and a no error container including a plurality of tools;
generating a log file and a metadata file by inputting a data file to the parsing tool, the log file including data describing events occurring during the parsing tool processing the data file using one or more data analytics functions, the metadata file including analytics data generated from the parsing tool processing the data file using the one or more data analytics functions and representing an outcome of the one or more data analytics functions;
determining, by inputting the log file to the filter tool, whether the log file includes at least one entry indicating an error occurred during the parsing tool processing the data file; and
responsive to determining that the log file includes at least one entry indicating the error:
generating a message that describes the error that occurred during the parsing tool processing the data file, wherein generating the message is performed without processing the metadata file using the plurality of tools of the no error container; and
displaying the message in a user interface; or
responsive to determining that the log file does not include at least one entry indicating the error:
generating additional analytics data by inputting the metadata file to at least one of the plurality of tools of the no error container, wherein generating the additional analytics data is performed without processing the log file using the one or more error tools of the error container; and
presenting the additional analytics data in the user interface.

9. The system of claim 8, wherein the no error container is implemented by a processor of a computing device, wherein generating the message is performed without providing power to the processor implementing the no error container.

10. The system of claim 8, wherein the error container is implemented by a processor of a computing device, wherein generating the additional analytics data is performed without providing power to the processor implementing the error container.

11. The system of claim 8, wherein generating the additional analytics data comprises generating at least one of a chart or a graph that depicts analytics derived from processing the metadata file using the at least one of the plurality of tools of the no error container.

12. The system of claim 8, wherein determining whether the log file includes at least one entry indicating the error is performed while the parsing tool is processing the data file, the operations further comprising pausing processing of the data file by the parsing tool until the error is resolved.

13. The system of claim 12, the operations further comprising:
receiving input at the user interface displaying the message, the input indicating that the error is resolved; and
resuming processing of the data file by the parsing tool responsive to receiving the input.

14. The system of claim 8, wherein generating the additional analytics data by inputting the metadata file to the at least one of the plurality of tools of the no error container is performed in parallel while the parsing tool is processing the data file.

15. A non-transitory computer-readable storage medium storing instructions that are executable by at least one processing device to perform operations comprising:
accessing an analytics workflow including a parsing tool, a filter tool, an error container including one or more error tools, and a no error container including a plurality of tools;
generating a log file and a metadata file by inputting a data file to the parsing tool, the log file including data describing events occurring during the parsing tool processing the data file using one or more data analytics functions, the metadata file including analytics data generated from the parsing tool processing the data file using the one or more data analytics functions and representing an outcome of the one or more data analytics functions;
determining, by inputting the log file to the filter tool, whether the log file includes at least one entry indicating an error occurred during the parsing tool processing the data file; and
responsive to determining that the log file includes at least one entry indicating the error:
generating a message that describes the error that occurred during the parsing tool processing the data file, wherein generating the message is performed without processing the metadata file using the plurality of tools of the no error container; and
displaying the message in a user interface; or
responsive to determining that the log file does not include at least one entry indicating the error:
generating additional analytics data by inputting the metadata file to at least one of the plurality of tools of the no error container, wherein generating the additional analytics data is performed without processing the log file using the one or more error tools of the error container; and
presenting the additional analytics data in the user interface.

16. The non-transitory computer-readable storage medium of claim 15, wherein the no error container is implemented by a processor of a computing device, wherein generating the message is performed without providing power to the processor implementing the no error container.

17. The non-transitory computer-readable storage medium of claim 15, wherein the error container is implemented by a processor of a computing device, wherein generating the additional analytics data is performed without providing power to the processor implementing the error container.

18. The non-transitory computer-readable storage medium of claim 15, wherein generating the additional analytics data comprises generating at least one of a chart or a graph that depicts analytics derived from processing the metadata file using the at least one of the plurality of tools of the no error container.

19. The non-transitory computer-readable storage medium of claim 15, wherein determining whether the log file includes at least one entry indicating the error is performed while the parsing tool is processing the data file, the operations further comprising pausing processing of the data file by the parsing tool until the error is resolved.

20. The non-transitory computer-readable storage medium of claim 15, wherein generating the additional analytics data by inputting the metadata file to the at least one of the plurality of tools of the no error container is performed in parallel while the parsing tool is processing the data file.

* * * * *